(12) United States Patent
Wu

(10) Patent No.: US 8,958,030 B2
(45) Date of Patent: Feb. 17, 2015

(54) BACKLIGHT UNIT HAVING BUFFER STRUCTURES AND LIQUID CRYSTAL DISPLAY DEVICE USING THE SAME

(75) Inventor: Ze-Xin Wu, Shenzhen (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 198 days.

(21) Appl. No.: 13/582,934

(22) PCT Filed: Jul. 11, 2012

(86) PCT No.: PCT/CN2012/078490
§ 371 (c)(1),
(2), (4) Date: Sep. 5, 2012

(87) PCT Pub. No.: WO2013/166773
PCT Pub. Date: Nov. 14, 2013

(65) Prior Publication Data
US 2013/0300972 A1  Nov. 14, 2013

(30) Foreign Application Priority Data

May 10, 2012  (CN) .......................... 2012 1 0143274

(51) Int. Cl.
*G02F 1/1335* (2006.01)
*F21V 8/00* (2006.01)

(52) U.S. Cl.
CPC ............ *G02B 6/0095* (2013.01); *G02B 6/0088* (2013.01)

USPC ............................................... 349/65; 349/58

(58) Field of Classification Search
USPC ....................................................... 349/65, 58
See application file for complete search history.

(56) References Cited

U.S. PATENT DOCUMENTS

2011/0069509 A1 *  3/2011  Lin et al. ....................... 362/607

FOREIGN PATENT DOCUMENTS

| CN | 1987596 | 6/2007 |
|---|---|---|
| CN | 101118338 | 2/2008 |
| CN | 101226307 | 7/2008 |
| CN | 201359237 | 12/2009 |
| CN | 102494273 | 6/2012 |
| CN | 102563468 | 7/2012 |
| JP | 2008078010 | 4/2008 |
| JP | 2012015000 | 1/2012 |
| WO | WO 2012023484 | 2/2012 |

\* cited by examiner

*Primary Examiner* — James Dudek
(74) *Attorney, Agent, or Firm* — Muncy, Geissler, Olds & Lowe, P.C.

(57) ABSTRACT

A backlight unit having buffer structures comprises a back cover, a light guide plate including an opening, and a buffer structure disposed in the back cover and the opening of the light guide plate is engaged with the buffer structure so as to connect the back cover with the light guide plate. In addition, a liquid crystal display device comprises the backlight unit and a liquid crystal panel adjacent to the backlight unit.

6 Claims, 4 Drawing Sheets

BACKLIGHT UNIT HAVING BUFFER STRUCTURES AND LIQUID CRYSTAL DISPLAY DEVICE USING THE SAME

FIELD OF THE INVENTION

The present invention relates to a backlight unit, and more particularly to a backlight unit having buffer structures and a liquid crystal display device using the same.

BACKGROUND OF THE INVENTION

With the improvement of technology, liquid crystal displays (LCD) are largely used in various consumer electronics including LCD TV, laptop computers, and so on. That means, the quality of LCD become a very important factor for electrical products.

Thereby, how to upgrade the quality of LCDs has became the important issue in panel industry, such that the related technology must be research and develop continuously for satisfying user's requirements.

SUMMARY OF THE INVENTION

The present invention provides a backlight unit having buffer structures and a liquid crystal display device using the same.

The technology solution of the present invention provides a backlight unit having buffer structures comprising: a back cover; a light guide plate including an opening; and a buffer structure disposed in the back cover, and the opening of the light guide plate is engaged with the buffer structure.

In one embodiment, the buffer structure includes a fixing member and a rubber ring disposed around the fixing member.

In one embodiment, the buffer structure is a protrusion of the back cover, and the protrusion has a recess part at a place near the back cover.

In one embodiment, the buffer structure is an elastic piece.

In one embodiment, the backlight unit further comprises a reflector, a backlight source, or an optical film set.

The technology solution of present invention provides a liquid crystal display device comprising a backlight unit and a liquid crystal panel adjacent to the backlight unit, wherein the backlight unit comprises a back cover; a light guide plate including an opening; and a buffer structure disposed in the back cover, and the opening of the light guide plate is engaged with the buffer structure.

In one embodiment, the buffer structure includes a fixing member and a rubber ring disposed around the fixing member.

In one embodiment, the buffer structure is a protrusion of the back cover, and the protrusion has a recess part at a place near the back cover.

In one embodiment, the buffer structure is an elastic piece.

In one embodiment, the backlight unit further comprises a reflector, a backlight source, or an optical film set.

DETAILED DESCRIPTION OF THE INVENTION

Now, the preferred embodiment of the present invention will be described in detail with reference to the accompanying drawings.

Figure 1:
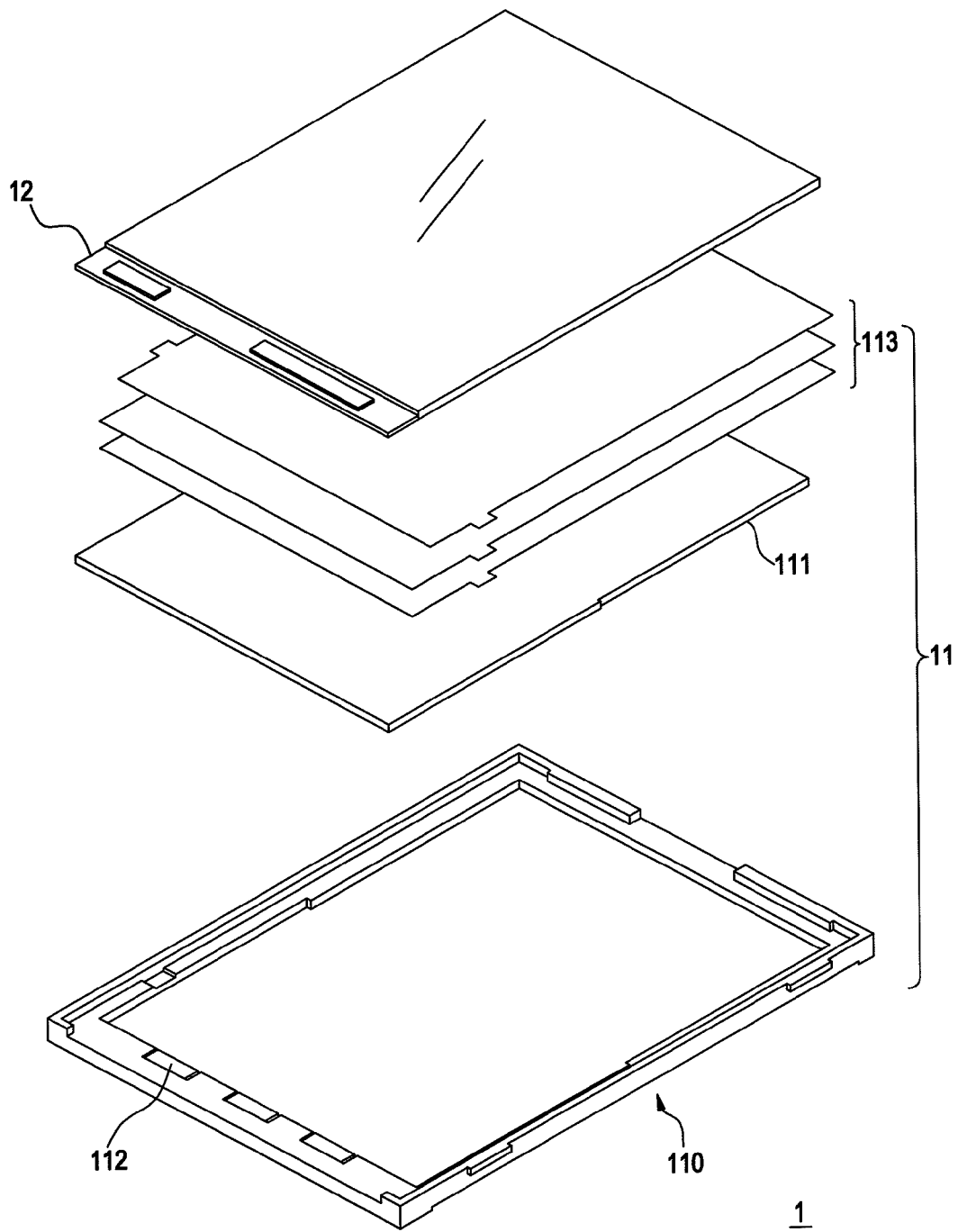
FIG. 1 illustrates an exploded perspective view of a liquid crystal display according to one embodiment of the present invention.

Referring FIG. 1, it illustrates an exploded perspective view of a liquid crystal display according to one embodiment of the present invention.

As shown in FIG. 1, the liquid crystal display device 1 includes a backlight unit 11 and a liquid crystal panel 12 adjacent to the backlight unit 11. The backlight unit 11 comprises a back cover 110, a light guide plate 111 and a buffer structure, wherein the buffer structure will be described as follows. In more detail, the backlight unit 11 may further comprise a reflector (not shown), a back light source (for example, LEDs), or an optical film set 113 (for example, diffusers or prism sheets), it will be understood by those skilled in the art, such that it will not be repeated herein.

Figure 2:
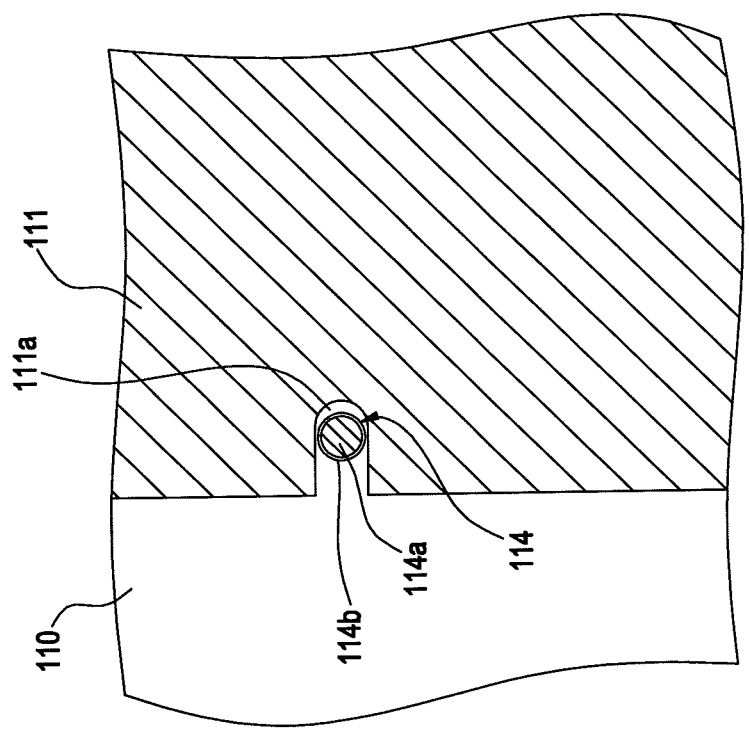
FIG. 2 illustrates a backlight unit having buffer structures according to one embodiment of the present invention.

Referring FIG. 2, it illustrates the backlight unit having buffer structures according to one embodiment of the present invention.

As shown in FIG. 2 and FIG. 1, the backlight unit having buffer structures (hereafter referred to as backlight unit 11) comprises a back cover 110, a light guide plate 111, and the buffer structure 114, wherein the light guide plate 111 comprises an opening 111a, and the buffer structure 114 is disposed in the back cover 110. That is, after the light guide plate 111 is accommodated in the back cover 110, the opening 111a of the light guide plate 111 is engaged the buffer structure 114 such that the light guide plate 111 can be fixed with the back cover 110 (or a back plate) by using the buffer structure 114.

In more detail, as shown in FIG. 2, the buffer structure 114 comprises a fixing member 114a and a rubber ring 114b disposed around the fixing member 114b, wherein the fixing member 114a is disposed in the back cover 110 and engaged with the opening of the light guide plate. Preferably, the fixing member 114a is a rivet, and the rubber ring 114b is sleeved in the rivet.

It will be seen from this that: the light guide plate 111 can prevent being damaged from the impact of external forces by using the rubber ring 114b of the buffer structure 114, while the fragments due to the friction between the light guide plate 111 and the fixing ring 114a (for example, rivet) caused by the external forces can be reduced.

Figure 3:
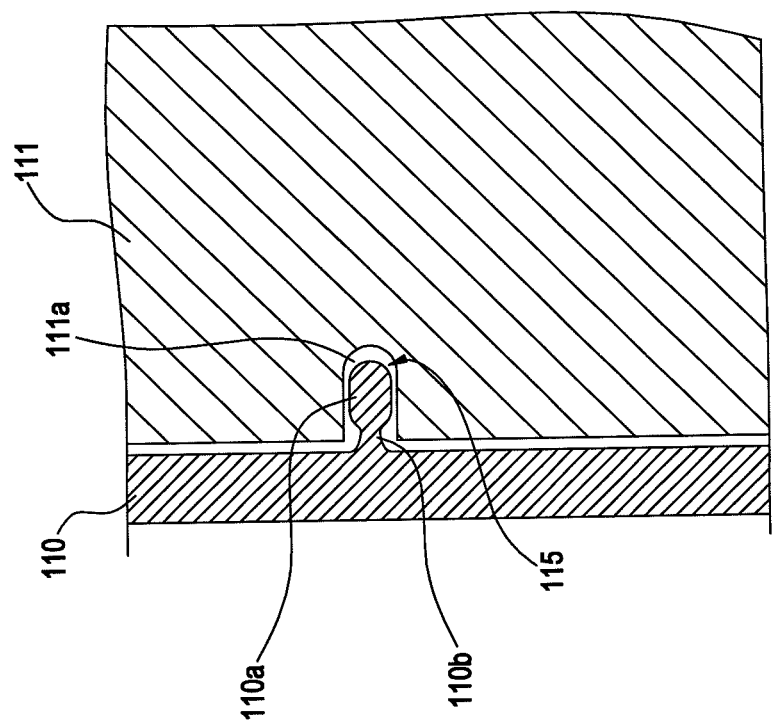
FIG. 3 illustrates a backlight unit having buffer structures according to another embodiment of the present invention.

Referring FIG. 3, it illustrates a backlight unit having buffer structures according to another embodiment of the present invention.

As shown in FIG. 3 and FIG. 1, the backlight unit having buffer structures (hereafter referred to as backlight unit 11) comprises a back cover 110 (such as a plastic or rubber frame), a light guide plate 111, and a buffer structure 115, wherein the light guide plate 111 comprises an opening 111a, the buffer structure 115 is disposed in a side wall of the back cover 110. That is, after the light guide plate 111 is accommodated in the back cover 110, the opening 111a of the light guide plate 111 is engaged with the buffer structure 115 such that the light guide plate 111 can be fixed with the back cover 110 (or a back plate) by using the buffer structure 115.

In more detail, as shown in FIG. 3, the buffer structure 115 is a protrusion 110a of the back cover 110 (for example, the protrusion 110a and the back cover 110 may be integrally formed, but is not limited thereto), and the protrusion 110a may have a recess part 110b at a place near the back cover 110.

It will be seen from this that: the buffer structure 115 is the protrusion 110a of the back cover 110 made of an elastic material and the protrusion 110a may have a recess part 110b at a place near the back cover 110. Beside, the protrusion 110a is able to stand deformation caused by external forces. When the deformation value is within the elastic range of the back cover 110 (i.e. a plastic or rubber frame), the protrusion 110a of the back cover 110 can not only absorb the energy of the external forces received by the light guide plate 111, but also restore automatically when the external forces disappear.

Figure 4:
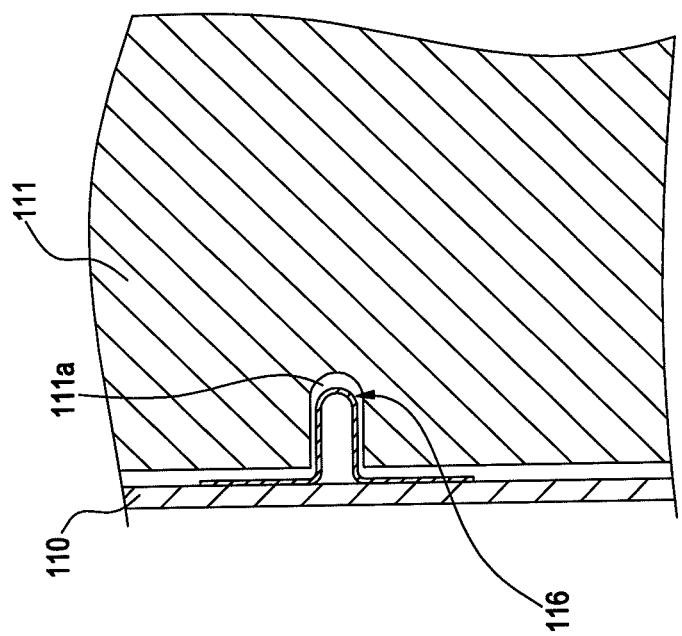
FIG. 4 illustrates a backlight unit having buffer structures according to still another embodiment of the present invention.

Referring FIG. 4, it illustrates a backlight unit having buffer structures according to still another embodiment of the present invention.

As shown in FIG. 4 and FIG. 1, the backlight unit having buffer structures (hereafter referred to as backlight unit 11) comprises a back cover 110 (i.e., the side walls of the back plate), a light guide plate 111, and a buffer structure 116, wherein the light guide plate 111 comprises an opening 111a, the buffer structure 114 is disposed in the back cover 110. That is, after the light guide plate 111 is accommodated in the back cover 110, the opening 111a of the light guide plate 111 is engaged with the buffer structure 116 such that the light guide plate 111 can be fixed with the back cover 110 (or a back plate) by using the buffer structure 116. In more detail, as shown in FIG. 4, the buffer structure 116 may be an elastic piece which can be fixed on the back cover 110 (i.e., the side walls of the back cover). Thereby, the light guide plate 111 can prevent being damaged from the impact of external forces by using the buffer structure 116.

As the foregoing, the backlight unit having buffer structures and the liquid crystal display device using the same of the embodiments of the present invention have advantage as follows:

1. the light guide plate can prevent being damaged from the impact of external forces by using the buffer structure.
2. the light guide plate can be fixed effectively, so it can avoid to collide with the back light source (i.e., LED).

The previous description of the preferred embodiment is provided to further describe the present invention, not intended to limit the present invention. Any modification apparent to those skilled in the art according to the disclosure within the scope will be construed as being included in the present invention.

What is claimed is:

1. A backlight unit having buffer structures, comprising:
   a back cover;
   a light guide plate, comprising an opening; and
   a buffer structure disposed in the back cover, and the opening of the light guide plate is engaged with the buffer structure,
   wherein the buffer structure includes a protrusion of the back cover, and the protrusion has a recess part at a place near the back cover.

2. The backlight unit having buffer structures of claim 1, wherein the buffer structure is an elastic piece.

3. The backlight unit having buffer structures of claim 1, wherein the backlight unit further comprises a reflector, a backlight source, or an optical film set.

4. A liquid crystal display device, comprising:
   a backlight unit, comprising:
   a back cover;
   a light guide plate, comprising an opening groove; and
   a buffer structure, disposed in the back cover, and the opening of the light guide plate is engaged with the buffer structure,
   a liquid crystal panel, adjacent to the backlight unit,
   wherein the buffer structure includes a protrusion of the back cover, and the protrusion has a recess part at a place near the back cover.

5. The liquid crystal display device of claim 4, wherein the buffer structure is an elastic piece.

6. The liquid crystal display device of claim 4, wherein the backlight unit further comprises a reflector, a backlight source, or an optical film set.

* * * * *